United States Patent [19]

Loffelman

[11] 4,381,372

[45] Apr. 26, 1983

[54] POLYMERS DERIVED FROM 4-BIS(CARBALKOXYETHYL)-PHOSPHINOXY-2,2,6,6-TETRAMETHYLPIPERIDINE

[75] Inventor: Frank F. Loffelman, Bridgewater, N.J.

[73] Assignee: American Cyanamid Company, Stamford, Conn.

[21] Appl. No.: 252,115

[22] Filed: Apr. 8, 1981

[51] Int. Cl.³ ................. C08G 69/26; C08L 23/12
[52] U.S. Cl. ............................. 525/181; 525/183; 525/184; 525/424; 525/425; 525/433; 528/337; 524/41; 546/21
[58] Field of Search ............. 528/321, 337; 546/21; 525/186, 181

[56] References Cited

U.S. PATENT DOCUMENTS 4,234,707  11/1980  Rody et al. ................. 525/523

Primary Examiner—Wilbert J. Briggs, Sr.
Attorney, Agent, or Firm—Steven J. Hultquist

[57] ABSTRACT

Polymers and oligomers of the formula

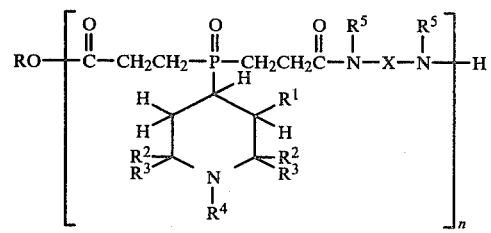

are useful as ultraviolet light stabilizers for various polymers, especially polyolefins.

12 Claims, No Drawings

POLYMERS DERIVED FROM 4-BIS(CARBALKOXYETHYL)-PHOSPHINOXY-2,2,6,6-TETRAMETHYLPIPERIDINE

This invention relates to certain novel compositions of matter. More particularly, this invention relates to novel polymers and oligomers of the formula (I):

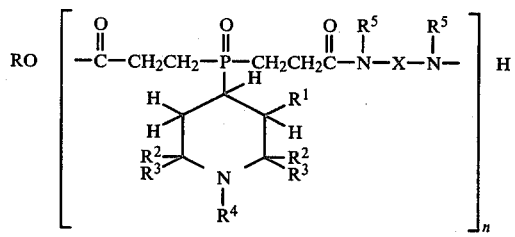

wherein R represents hydrogen, $C_1$–$C_{18}$ alkyl, or benzyl; $R^1$, $R^2$, and $R^3$ independently represent hydrogen $C_1$–$C_6$ alkyl, benzyl, or phenethyl, or $R_2$ and $R_3$ together with the carbon to which they are attached form a $C_5$–$C_{10}$ cycloalkyl; $R^4$ is hydrogen, $C_1$–$C_6$ alkyl, hydroxyl, or oxyl; $R^5$ is hydrogen, $C_1$–$C_6$ alkyl, or

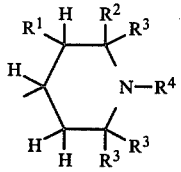

wherein $R^1$, $R^1$, $R^3$, and $R^4$ are as previously defined; X is $C_2$–$C_{12}$ alkylene optionally interrupted by an oxy, thio, or

radial; or X is $C_5$–$C_{10}$ cycloalkylene,

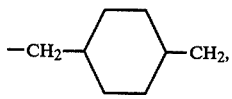

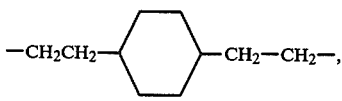

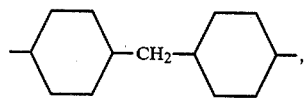

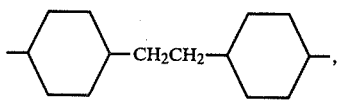

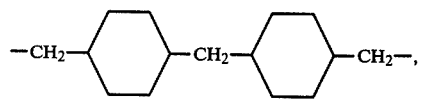

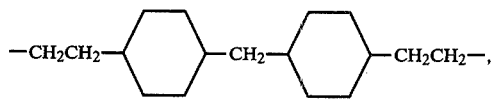

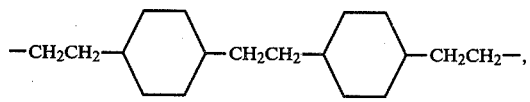

$C_6$–$C_{12}$ arylene, or $C_8$–$C_{14}$ aralkylene; and n is an integer greater than 1; to the use of such materials for stabilizing plastics, particularly polyolefins, against degradation by ultraviolet radiation, and, to the resulting stabilized plastics.

Preferred polymers and oligomers are represented by formula (II):

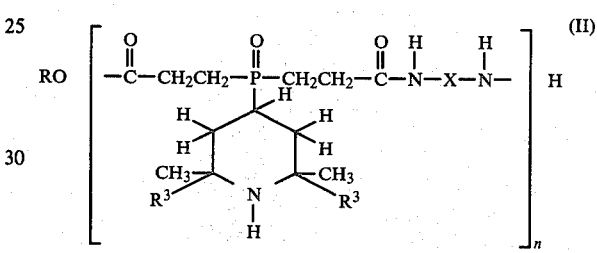

wherein R, $R^3$, X and n are as previously defined.

It is well-known that sunlight and other sources of ultraviolet radiation cause degradation of polymers as evidenced by embrittlement or yellowing of plastic articles made therefrom. It is also well-known that this degradation can be inhibited by use of ultraviolet light stabilizers incorporated in or on such articles. Various additives, used alone or in combinations, have been suggested to inhibit such light degradation in order to prolong the useful lives of articles made from plastic materials. Since none has been found to be completely satisfactory, research continues in order to find compounds or combinations of compounds which will be more satisfactory. The present invention arose out of such research and resulted in the discovery of novel polymers and oligomers which stabilize polymers against degradation by ultraviolet light.

The compositions of the present invention offer the following advantages:

(1) Low volatility for processing, and ability to withstand heating, such as tentering, to which the polymer is subjected during processing.

(2) Low extractability from the plastic by the elements, or by materials incoporated in the plastic, during laundering and dry cleaning.

The compositions of formula (I) may be prepared by reacting a compound of formula (III) with an alkylene diamine of formula (IV), as illustrated below:

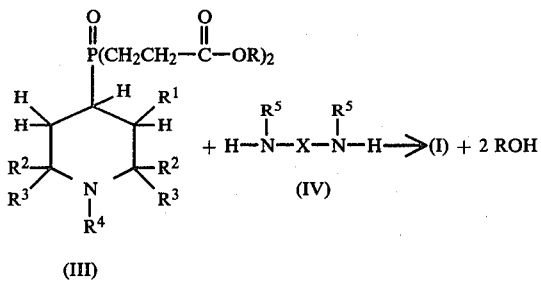

Intermediates of formula (III) are disclosed in U.S. Pat. No. 3,970,636. Suitable compounds of formula (III) include dialkyl 3,3'-[(2,2,6,6-tetramethyl-4-piperidinyl)-phosphinylidene]dipropionates wherein the $C_1$-$C_{18}$ alkyl radical is methyl, ethyl, propyl, butyl, hexyl, octyl, decyl, dodecyl, octadecyl, and the like.

Suitable compounds of formula (IV) include compounds wherein X is ethylene, trimethylene, tetramethylene, pentamethylene, hexamethylene, dodecamethylene, 1,4-cyclohexylene, methylenedi-4,1-cyclohexylene, 1,4-phenylene, 2-methyl-1,4-phenylene, 3,4-dimethyl-1,2-phenylene, biphenylene, phenylenebis(-methylene), p-phenylenemethylene, and the like.

Plastic materials which are stabilized against degradation by ultraviolet light using these polymers include polyvinyl chloride, polyvinylidene chloride, copolymers of vinyl chloride and vinylidene chloride, polystyrene, polyesters, cellulose acetate, poly(vinyl acetate), poly(vinyl fluoride), poly(methyl methacrylate), polyurethanes, polycarbonates and natural and synthetic rubbers such as polymers of acrylonitrile, butadiene, and styrene. They are particularly useful in polyolefins, such as polyethylene and polypropylene. These compounds may be incorporated in or on such plastic materials by any of the various standard procedures known in the art for such purpose, such as by dry blending the additive with the polymer in powder or granular form followed by molding or extruding; by milling; by immersing the polymer as film, sheet, fibers, etc. in a solution of the additive in an appropriate solvent (as in a dye process); etc.

The plastic material should contain an effective stabilizing amount of the polymer of formula (I), which amount will depend on the nature of the plastic and the amount of exposure to ultraviolet light to which the plastic will be subjected. Generally, an amount between about 0.1% and 5% by weight of stabilizer, based on the weight of the plastic, will be found satisfactory and between about 0.2% and 2% will be preferred.

The polymer of formula (I) may be used in the plastic alone or in combination with other additives, such as fillers, antioxidants, flame retardants, heat stabilizers, anti-slipping and anti-static agents, supplemental light stabilizers, pigments, dyes, lubricants, etc.

Suitable antioxidants include those of the hindered-phenol type, such as 2,6-di-t-butyl-p-cresol; 4,4'-bis(2,6-di-t-butylphenol); 4,4'-bis(2,6-diisopropylphenol); 2,4,6-tri-t-butyphenol; 2,2'-thiobis(4 methyl-6-t-butylphenol); octadecyl 2(3',5'-di-t-butyl-4'-hydroxyphenyl)propoionate; tris(4-t-butyl-3-hydroxy-2,6-dimethylbenzyl)-s-triazine-2,4,6-(1H,3H,5H)-trione etc.; esters of thiodipropionic acid, such as dilauryl thiodipropionate and distearyl thiodipropionate, etc.; hydrocarbyl phosphites, such as triphenyl phosphite, trinonyl phosphite, diisodecyl pentaerythrityl diphosphite, diphenyldecyl phosphite, etc.; and combinations thereof.

Suitable supplemental light stabilizers include those of the benzotriazole class, such as 2-(2'-hydroxy-5-t-octylphenyl)benzotriazole; 2-(2'hydroxy-3', 5'-di-t-butylphenyl)-5-chlorobenzotriazole; those of the hydroxybenzophenone type, such as 2-hydroxy-4-methoxybenzophenone; 2-hydroxy-4-octyloxybenzophenone; 2,2'-dihydroxy-4,4'-di-methoxybenzophenone; hindered phenol esters, such as n-hexadecyl 3,5-di-t-butyl-4hydroxybenzoate, and 2',-4'-di-t-butylphenyl 3,5-di-t-butyl-4-hydroxybenzoate; metal complexes, such as nickel complexes of 2,2'-thiobis(4-6-octylpheol); nickel butylamine complex of ,2,2'-thiobis(4-t-octylphenol); nickel complexes of bis(4-t-octylphenyl)sulfone; nickel dibutyl dithiocarbamate; nickel salts of 4-hydroxy-3,5-di-t-butylbenzyl phosphonic acid monoalkyl esters where alkyl is methyl, ethyl, propyl, butyl, etc.; nickel complex of 2-hydroxy-4-methylphenyl undecyl ketone oxime; etc. Further illustrative examples of suitable antioxidants and supplemental light stabilizers can be found in columns 3 and 4 of U.S. Patent Nos. 3,488,290 and 3,496,134, and in the other patents mentioned therein.

As with the compound of formula (I), the additive is advantageously employed within the range from about 0.2% to about 2% by weight, based on the weight of the untreated polymer.

The following examples illustrate the present invention. All parts and percentages mentioned therein are by weight unless otherwise indicated.

EXAMPLE 1

Preparation of Diethyl 3-3'-[2,2,6,6-tetramethyl-4-piperidinyl)phosphinylidene]dipropionate Triacetoneamine (34.6 grams; 0.2 mole) is added to concentrated hydrochloric acid (150 mls) while stirring in a 3necked, round-bottom flask. When the addition is completed, bis(2-cyanoethyl)phosphine (28.0 grams; 0.2 mole) is added thereto while stirring under nitrogen. The resulting mixture is then gradually heated to reflux and stirred at reflux for 24 hours. The reaction mixture is then concentrated on a rotary evaporator to remove water, and the resulting pale yellow gum is triturated with absolute ethanol. The insoluble precipitate is separated by filtration, and an equal volume of toluene is added to the filtrate. The resulting mixture is heated to reflux and the distillate is collected in a Dean Stark trap. As the distillate is collected, an equal volume of toluene is added to the distillation vessel. After no more water is removed, the reaction mixture is dissolved in water and the solution is made basic with sodium carbonate. The solution is extracted three times with chloroform, and the chloroform extracts are combined, washed with water, and dried. The dried extract is heated on a rotary evaporator to remove the chloroform and obtain a mobile orange oil.

Calculated for $C_{19}H_{36}NO_5P$: C,58.7%; H,9.3%; N,3.6%; P,8.0%. Found C,56.9%; H,9.1%; N,3.1%; P,8.7%.

EXAMPLE 2

The product of Example 1 (6.5 grams; 0.017 mole) is placed in a flask and molten 1,6-hexamethylenediamine (2.0 grams; 0.017 mole) is added thereto. The mixture is heated to 180°-195° C. and stirred thereat under a vacuum for 17 hours. The resulting solid mass is removed from the flask, pulverized, and dried in a vacuum oven. The resulting organe chips are then ground in a mill to form granules.

Calculated for $(C_{21}H_{39}N_3O_3P)_n$: C,61.14%; H,9.53%, N,10.19%; P,7.51%. Found: C,59.04%; H,9.86%; N,11.35%; P,7.76%.

EXAMPLE 3

The product of Example 1 (1.9 grams; 0.005 mole) and bis(4-aminocyclohexyl)methane (1.6 grams; 0.005 mole) are mixed together and placed in a flask. The flask is immersed in an oil-bath at 190° C. and the resulting melt is stirred magnetically until it becomes too viscous to stir. Heating is continued for an additional 12 hours, the product is cooled to ambient temperature, and the resulting brittle solid (m.p. 170°-230' C.) is ground to a powder. The product is slightly soluble in hot N,N-dimethylformamide.

Calculated for $(C_{28}H_{50}N_3O_3P)_n$: C,66.37%; H,9.75%, N,8.29%; P,6.11%. Found: C,62.85%; H,9.33%; N,7.57%; P,6.02%.

EXAMPLE 4

The procedure of Example 3 is followed in every detail except that the flask is immersed in an oil-bath at 150° C. for 4 hours. The reaction mixture is then removed from the oil-bath, cooled to ambient temperature, and then dried in an oven at 25° C. for 3 days. The resulting gummy solid (m.p. 100°-140° C.) is soluble in hot ethanol.

Calculated for $(C_{28}H_{50}N_3O_3P)_n$: N,8.29%; P,6.11%. Found: N,6.95%; P,5.55%.

EXAMPLES 5-7

Testing in Polypropylene

The compositions of Examples 2, 3, and 4 (0.25 gram) are separately dry blended with a mastermix of 100 grams of unstabilized polypropylene (Pro-fax® 6401) and 0.10 gram of a processing antioxidant, 2,4,6-tri-t-butyl-phenol. The blend is milled at 350-370° F. for five minutes, and then compression miolded at 400° F. into a film 4-5 mils thick. The film and a control film, identically prepared without the compound under test, are exposed to a xenon arc in an Atlas WeatherOmeter ® until they fail. A film is considered as having failed when the carbonyl content of the infrared absorption spectrum increases by 0.10% by weight, a generally accepted point of film embrittlement.

The data in Table I show the number of hours required to increase the carbonyl content by 0.1% by weight for the compounds under test and a control film.

TABLE I

| Example | Additive | Hours to Failure |
|---------|----------|------------------|
| 5 | Product of Example 2 | 800 |
| 6 | Product of Example 3 | 800 |
| 7 | Product of Example 4 | 900 |
|   | Control | 400 |

What is claimed is:

1. A composition of matter represented by formula (I):

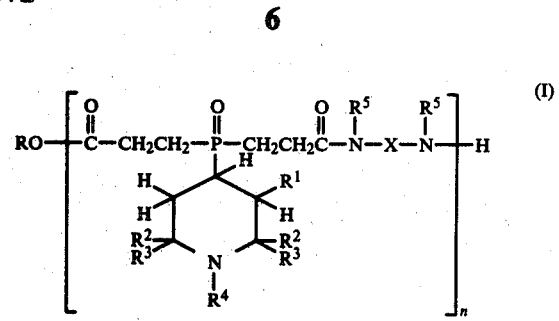

wherein R represents hydrogen, $C_1$-$C_{18}$ alkyl, or benzyl; $R^1$, $R^2$, and $R^3$ independently represent hydrogen $C_1$-$C_6$ alkyl, benzyl, or phenethyl, or $R^2$ and $R^3$ together with the carbon to which they are attached form a $C_5$-$C_{10}$ cycloalkyl; $R^4$ is hydrogen, $C_1$-$C_6$ alkyl, hydroxyl, or oxyl; $R^5$ is hydrogen, $C_1$-$C_6$ alkyl, or

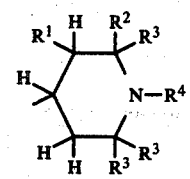

wherein $R^1$, $R^2$, $R^3$, and $R^4$ are as previously defined; X is $C_2$-$C_{12}$ alkylene optionally interrupted by an oxy, thio, or

radical; or X is $C_5$-$C_{10}$ cycloalkylene,

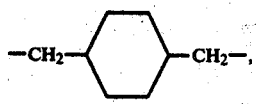

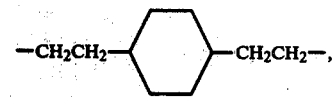

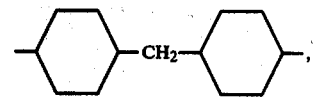

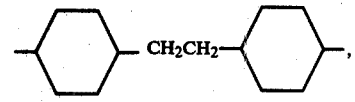

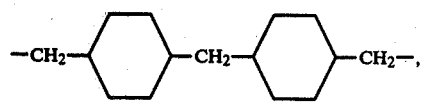

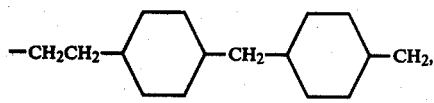

-continued

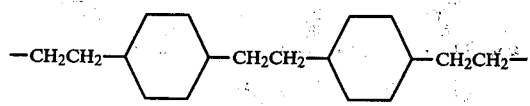

$C_6$-$C_{12}$ arylene, or $C_8$-$C_{14}$ aralkylene; and, n is an integer greater than 1.

2. The composition of claim 1 represented by formula (II):

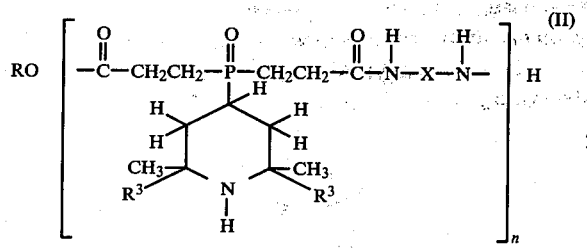

wherein R, $R^3$, and n are as previously defined.

3. The composition of claim 2 wherein X is hexamethylene.

4. The composition of claim 2 wherein X is methylene di-4,1-cyclohexylene.

5. A method for stabilizing a polymer which is normally subject to degradation by ultraviolet radiation which comprises incorporating into said polymer an ultraviolet stabilizingly effective amount of a stabilizer of claim 1.

6. The method of claim 5 wherein the stabilizer is incorporated in a concentration from about 0.2% to about 2% based on the weight of the polymer.

7. The method of claim 5 wherein the polymer is a polyolefin.

8. The method of claim 7 wherein the polyolefin is polypropylene.

9. The method of claim 5 wherein the stabilizer is that of claim 2.

10. The method of claim 9 wherein X is hexamethylene.

11. The method of claim 9 wherein X is methylene di-4,1-cyclohexylene.

12. The compositions produced by the method of claims 5, 6, 7, 8, 9, 10 or 11.

* * * * *